(12) United States Patent
Karunakaran et al.

(10) Patent No.: US 9,120,926 B2
(45) Date of Patent: Sep. 1, 2015

(54) CURABLE COMPOSITIONS (71) Applicant: Dow Global Technologies LLC, Midland, MI (US)

(72) Inventors: Radhakrishnan Karunakaran, Lake Jackson, TX (US); Nikhil E. Verghese, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/356,806

(22) PCT Filed: Nov. 9, 2012

(86) PCT No.: PCT/US2012/064470
§ 371 (c)(1),
(2) Date: May 7, 2014

(87) PCT Pub. No.: WO2013/071122
PCT Pub. Date: May 16, 2013

(65) Prior Publication Data
US 2014/0343234 A1    Nov. 20, 2014

Related U.S. Application Data (60) Provisional application No. 61/557,578, filed on Nov. 9, 2011.

(51) Int. Cl.
C08L 63/00    (2006.01)
C08L 71/02    (2006.01)
C08L 53/00    (2006.01)

(52) U.S. Cl.
CPC ............ C08L 63/00 (2013.01); C08L 53/00 (2013.01); C08L 71/02 (2013.01)

(58) Field of Classification Search
None
See application file for complete search history.

(56) References Cited

U.S. PATENT DOCUMENTS

| | | |
|---|---|---|
| 2009/0082486 A1 | 3/2009 | Bates et al. |
| 2010/0197848 A1 | 8/2010 | Verghese et al. |
| 2011/0104498 A1* | 5/2011 | Turakhia et al. ............ 428/411.1 |
| 2011/0259514 A1* | 10/2011 | Boyle et al. .................. 156/276 |
| 2011/0319523 A1 | 12/2011 | Ji et al. |

FOREIGN PATENT DOCUMENTS

WO    2009074532    6/2009

OTHER PUBLICATIONS

International Search Report and Written Opinion for related PCT Application PCT/US2012/064470, mailed Jan. 3, 2014 (14 pgs).
Grubbs R.B., et al.: "Reactive Block Copolymers for Modification of Thermosetting Repoxy", Macromolecules, American Chemical Society, Washington, DC; US, vol. 33, No. 26, Dec. 1, 2000 (pp. 9522-9534).

* cited by examiner

*Primary Examiner* — Ana Woodward
(74) *Attorney, Agent, or Firm* — Brooks, Cameron & Huebsch, PLLC (57) ABSTRACT

Curable compositions including an epoxy resin, a hardener, and a block copolymer having a thermoset-philic block and a thermoset-phobic block, where the block copolymer is from 20 weight percent to 80 weight percent of the curable composition are described herein.

10 Claims, 4 Drawing Sheets

CURABLE COMPOSITIONS

CROSS-REFERENCE TO RELATED APPLICATIONS

This application is a National Stage Application under 35 U.S.C. §371 of International Application Number PCT/US2012/064470, filed Nov. 9, 2012 and published as WO 2013/071122 on May 16, 2013, which claims the benefit to U.S. Provisional Application 61/557,578, filed Nov. 9, 2011, the entire contents of which are incorporated herein by reference in its entirety.

FIELD OF DISCLOSURE

The present disclosure relates generally to curable compositions, and more particularly to curable compositions having a block copolymer.

BACKGROUND

Curable compositions may include two components that can chemically react with each other, also referred to as curing, to form a cured product. A first component may be an epoxy resin and a second component may be a hardener, sometimes called a curing agent. The epoxy resin can include one or more epoxide groups. An epoxide group refers to a group in which an oxygen atom is directly attached to two adjacent carbon atoms of a carbon chain or ring system. The hardener is reactive with the epoxide groups of the epoxy resin. This curing converts the resin component from a relatively low molecular weight into relatively high molecular weight materials by chemical addition of the compounds of the hardening agent.

There are many possible uses for curable compositions and products obtained by curing those compositions. There are a great variety of characteristics that may be desirable for particular applications.

SUMMARY

One or more embodiments of the present disclosure provide a curable composition having an epoxy resin, a hardener selected from the group consisting of an anhydride, an amine, a phenolic, and combinations thereof, and a block copolymer having a thermoset-philic block and a thermoset-phobic block, wherein the block copolymer is from 20 weight percent to 80 weight percent of the curable composition.

One or more embodiments of the present disclosure provide a product obtained by curing a curable composition as disclosed herein.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Embodiments of the present disclosure provide curable compositions. The curable compositions, as disclosed herein, include an epoxy resin, a hardener, and a block copolymer having a thermoset-philic block and a thermoset-phobic block, where the block copolymer is from 20 weight percent to 80 weight percent of the curable composition.

Embodiments of the present disclosure can provide benefits such as increased flexibility, e.g. a decreased modulus of elasticity, as compared to products obtained from other curable compositions. Block copolymers have been added to curable compositions to improve the toughness of products obtained from those compositions. Toughness is a quantitative way of expressing a material's resistance to fracture. Block copolymers have been found to increase the toughness of the cured products, while at the same time resulting in no, or only minor, changes to other physical properties such as modulus of elasticity, which is a measure of stiffness of a material and glass transition temperature, which is a temperature that a material transitions from a glassy state to a rubbery state. However, new curable compositions and new products in accordance with one or more embodiments described herein are disclosed. The products disclosed herein may be useful for applications including coatings, laminates, composites, and adhesives, for example. The products disclosed herein may be advantageous for some applications where an increased flexibility is desired, for example. The products obtained by curing the curable compositions disclosed herein may provide a similar or an increased percentage of elongation at break as compared to other products obtained by curing curable compositions having less than 20 weight percent of block copolymer.

The curable compositions of the present disclosure include a block copolymer having a thermoset-philic block and a thermoset-phobic block, wherein the block copolymer is from 20 weight percent to 80 weight percent of the curable composition. The thermoset-philic block may be from 20 weight percent to 80 weight percent of the block copolymer, such that the thermoset-philic block and the thermoset-phobic block combine to be 100 weight percent of the block copolymer. The thermoset-phobic block may be from 20 weight percent to 80 weight percent of the block copolymer, such that the thermoset-phobic block and the thermoset-philic block combine to be 100 weight percent of the block copolymer.

A block copolymer is a polymer consisting of multiple sequences (blocks) of one type of constitutional unit or units, e.g., derivable from one monomer or multiple monomers, alternating in series with different blocks having another type of constitutional unit or units. Examples of the block copolymer include, but are not limited to, diblock copolymers, triblock copolymers, tetrablock copolymers, and higher order block copolymers. The block copolymer may have a linear block structure, a branched block structure, a star block structure, and combinations thereof. The block copolymers may be formed via various polymerization processes, such as one or more known polymerization processes.

A thermoset-philic block may include from 5 to 1000 constitutional units. A thermoset-phobic block may include from 5 to 1000 constitutional units.

In accordance with one or more embodiments of the present disclosure, the thermoset-philic block includes constitutional units that are derived from an alkylene oxide monomer having from two to three carbon atoms. In accordance with one or more embodiments of the present disclosure, the thermoset-philic block may be from 70 weight percent to 100 weight percent of constitutional units that are derived from an alkylene oxide monomer having from two to three carbon atoms. All individual values and subranges from a lower limit of 70 weight percent, 75 weight percent, or 80 weight percent of constitutional units that are derived from an alkylene oxide monomer having from two to three carbon atoms to an upper limit of 100 weight percent, 95 weight percent, or 90 weight percent of constitutional units that are derived from an alkylene oxide monomer having from two to three carbon atoms. For instance, the thermoset-philic block may be from 70 weight percent to 100 weight percent, 75 weight percent to 95 weight percent, or 80 weight percent to 90 weight percent of constitutional units that are derived from an alkylene oxide monomer having from two to three carbon atoms. As such, the thermoset-philic block may include constitutional units that are derived from another monomer or monomers, e.g., an alkylene oxide monomer having from four to twenty carbon atoms, among other monomers, where the another monomer or monomers may be from 0 weight percent to 30 weight percent of the thermoset-philic block. Examples of alkylene oxides having from two to three carbon atoms include, but are not limited to, ethylene oxide, propylene oxide, and combinations thereof. As such, for example, the thermoset-philic block may include a polyethylene oxide block, a polypropylene oxide block, a poly(ethylene oxide-co-propylene oxide) block, or combinations thereof.

In accordance with one or more embodiments of the present disclosure, the thermoset-phobic block includes constitutional units that are derived from an alkylene oxide monomer having from four to twenty carbon atoms. In accordance with one or more embodiments of the present disclosure, the thermoset-phobic block may be from 70 weight percent to 100 weight percent of constitutional units that are derived from an alkylene oxide monomer having from four to twenty carbon atoms. All individual values and subranges from a lower limit of 70 weight percent, 75 weight percent, or 80 weight percent of constitutional units that are derived from an alkylene oxide monomer having from four to twenty carbon atoms to an upper limit of 100 weight percent, 95 weight percent, or 90 weight percent of constitutional units that are derived from an alkylene oxide monomer having from four to twenty carbon atoms. For instance, the thermoset-phobic block may be from 70 weight percent to 100 weight percent, 75 weight percent to 95 weight percent, or 80 weight percent to 90 weight percent of constitutional units that are derived from an alkylene oxide monomer having from four to twenty carbon atoms. As such, the thermoset-phobic block may include constitutional units that are derived from another monomer or monomers, e.g., an alkylene oxide monomer having from two to three carbon atoms, among other monomers, where the another monomer or monomers may be from 0 weight percent to 30 weight percent of the thermoset-phobic block. Examples of alkylene oxides having from four to twenty carbon atoms include, but are not limited to, butylene oxide, 1,2 epoxy hexane, 1,2-epoxy dodecane, and combinations thereof. As such, for example, the thermoset-phobic block may include a polybutylene oxide block, a polyhexylene oxide block, a polydodecylene oxide block, or combinations thereof.

For embodiments where the thermoset-philic block includes constitutional units that are derived from an alkylene oxide monomer having from two to three carbon atoms and the thermoset-phobic block includes constitutional units that are derived from an alkylene oxide monomer having from four to twenty carbon atoms, the block copolymer may have a number average molecular weight of from 1000 to 50000. All individual values and subranges from and including 1000 to 50000 are included herein and disclosed herein; for example, block copolymer may have a number average molecular weight in a range with a lower limit 1000, 2000, or 5000 to an upper limit of 50000, 45000, or 40000.

In accordance with one or more embodiments of the present disclosure, the thermoset-philic block includes constitutional units that are derived from a methacrylate ester monomer. In accordance with one or more embodiments of the present disclosure, the thermoset-philic block may be from 70 weight percent to 100 weight percent of constitutional units that are derived from a methacrylate ester monomer. All individual values and subranges from a lower limit of 70 weight percent, 75 weight percent, or 80 weight percent of constitutional units that are derived from a methacrylate ester monomer to an upper limit of 100 weight percent, 95 weight percent, or 90 weight percent of constitutional units that are derived from a methacrylate ester monomer. For instance, the thermoset-philic block may be from 70 weight percent to 100 weight percent, 75 weight percent to 95 weight percent, or 80 weight percent to 90 weight percent of constitutional units that are derived from a methacrylate ester monomer. As such, the thermoset-philic block may include constitutional units that are derived from another monomer or monomers, e.g., an acrylate ester monomer, among other monomers, where the another monomer or monomers may be from 0 weight percent to 30 weight percent of the thermoset-philic block.

The methacrylate ester monomer may be selected from the group consisting of methyl methacrylate, higher homologues of methyl methacrylate, and combinations thereof. Examples of higher homologues of methyl methacrylate include, but are not limited to, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cycloheyl methacrylate, 2-ethylhexyl methacrylate, pentadecyl methacrylate, dodecyl methacrylate, isobornyl methacrylate, phenyl methacrylate, benzyl methacrylate, phnoxyethyl methacrylate, 2-hydroxy ethyl methacrylate, 2-methoxyethyl methacrylate, and combinations thereof.

In accordance with one or more embodiments of the present disclosure, the thermoset-phobic block includes constitutional units that are derived from an acrylate ester monomer. In accordance with one or more embodiments of the present disclosure, the thermoset-phobic block may be from 70 weight percent to 100 weight percent of constitutional units that are derived from an acrylate ester monomer. All individual values and subranges from a lower limit of 70 weight percent, 75 weight percent, or 80 weight percent of constitutional units that are derived from an acrylate ester monomer to an upper limit of 100 weight percent, 95 weight percent, or 90 weight percent of constitutional units that are derived from an acrylate ester monomer. For instance, the thermoset-phobic block may be from 70 weight percent to 100 weight percent, 75 weight percent to 95 weight percent, or 80 weight percent to 90 weight percent of constitutional units that are derived from an acrylate ester monomer. As such, the thermoset-phobic block may include constitutional units that are derived from another monomer or monomers, e.g., a methacrylate ester monomer, among other monomers, where the another monomer or monomers may be from 0 weight percent to 30 weight percent of the thermoset-phobic block. Examples of the acrylate ester monomer include n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phnoxyethyl acrylate, 2-hydroxy ethyl acrylate, 2-methoxy ethyl acrylate, and combinations thereof.

For embodiments where the thermoset-philic block includes constitutional units that are derived from a monomer selected from the methacrylate ester monomer, and the thermoset-phobic block includes constitutional units that are derived from the acrylate ester monomer, the block copolymer may have a number average molecular weight of from 1000 to 100000. All individual values and subranges from and including 1000 to 100000 are included herein and disclosed herein; for example, block copolymer may have a number average molecular weight in a range with a lower limit 1000, 2000, or 5000 to an upper limit of 100000, 90000, or 80000.

In accordance with one or more embodiments of the present disclosure, the curable compositions include an epoxy resin. An epoxy resin is a compound in which an oxygen atom is directly attached to two adjacent or non-adjacent carbon atoms of a carbon chain or ring system. The epoxy resin can be selected from the group consisting of an aromatic epoxy resin, an alicyclic epoxy resin, an aliphatic epoxy resin, and combinations thereof.

Examples of aromatic epoxy resins include, but are not limited to, divinylarene dioxide, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2,2-bis(4-hydroxyphenyl)-1,1,1,3,3,3-hexafluoropropane, and 1,6-dihydroxynaphthalene.

Examples of alicyclic epoxy resins include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to, hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methyleyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; and di-2-ethylhexyl epoxyhexahydrophthalate.

Examples of aliphatic epoxy resins include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; and diglycidyl esters of aliphatic long-chain dibasic acids.

In accordance with one or more embodiments of the present disclosure, the curable compositions include a hardener. The hardener can be selected from the group consisting of an anhydride, an amine, a phenolics, and combinations thereof.

An anhydride is a compound having an anhydride group, e.g., two acyl groups bonded to the same oxygen atom. The anhydride can be symmetric or mixed. Symmetric anhydrides have identical acyl groups. Mixed anhydrides have different acyl groups. The anhydride can be selected from the group consisting of hexahydrophthalic anhydride, methyltetrahydrophthalic anhydride, methylhexahydrophthalic anhydride, methylnadic anhydride, methylbutenyltetrahydrophthalic anhydride, and combinations thereof.

Amines include compounds that contain an N—H moiety, e.g. primary amines and secondary amines. The amine can be selected from the group consisting of aliphatic polyamines, arylaliphatic polyamines, cycloaliphatic polyamines, aromatic polyamines, heterocyclic polyamines, polyalkoxy polyamines, dicyandiamide and derivatives thereof, aminoamides, amidines, ketimines, and combinations thereof.

Examples of aliphatic polyamines include, but are not limited to, ethylenediamine, diethylenetriamine, triethylenetetramine, trimethyl hexane diamine, hexamethylenediamine, N-(2-aminoethyl)-1,3-propanediamine, N,N'-1,2-ethanediylbis-1,3-propanediamine, dipropylenetriamine, and reaction products of an excess of these amines with an epoxy resin, such as bisphenol A diglycidyl ether, and combinations thereof.

Examples of arylaliphatic polyamines include, but are not limited to, m-xylylenediamine, and p-xylylenediamine. Examples of cycloaliphatic polyamines include, but are not limited to, 1,3-bisaminocyclohexylamine, isophorone diamine, and 4,4'-methylenebiscyclohexaneamine. Examples of aromatic polyamines include, but are not limited to, m-phenylenediamine, diaminodiphenylmethane, and diaminodiphenylsulfone. Examples of heterocyclic polyamines include, but are not limited to, N-aminoethylpiperazine, 3,9-bis(3-aminopropyl) 2,4,8,10-tetraoxaspiro(5,5) undecane, and combinations thereof.

Examples of polyalkoxy polyamines include, but are not limited to, 4,7-dioxadecane-1,10-diamine; 1-propanamine; (2,1-ethanediyloxy)-bis-(diaminopropylated diethylene glycol) (ANCAMINE® 1922A); poly(oxy(methyl-1,2-ethanediyl)), alpha-(2-aminomethylethyl)omega-(2-aminomethylethoxy) (JEFFAMINE® D-230, D-400); triethyleneglycoldiamine; and oligomers (JEFFAMINE® XTJ-504, JEFFAMINE® XTJ-512); poly(oxy(methyl-1,2-ethanediyl)), alpha,alpha'-(oxydi-2,1-ethanediyl)bis(omega- (aminomethylethoxy)) (JEFFAMINE® XTJ-511); bis(3-aminopropyl)polytetrahydrofuran 350; bis(3-aminopropyl)polytetrahydrofuran 750; poly(oxy(methyl-1,2-ethanediyl)); α-hydro-ω-(2-aminomethylethoxy)ether with 2-ethyl-2-(hydroxymethyl)-1,3-propanediol (JEFFAMINE® T-403); diaminopropyl dipropylene glycol; and combinations thereof.

Examples of dicyandiamide derivatives include, but are not limited to, guanazole, phenyl guanazole, cyanoureas, and combinations thereof.

Examples of aminoamides include, but are not limited to, amides formed by reaction of the above aliphatic polyamines with a stoichiometric deficiency of anhydrides and carboxylic acids, as described in U.S. Pat. No. 4,269,742.

Examples of amidines include, but are not limited to, carboxamidines, sulfinamidines, phosphinamidines, and combinations thereof Examples of ketimines include compounds having the structure $(R^2)_2C=NR^3$, where each $R^2$ is an alkyl group and $R^3$ is an alkyl group or hydrogen, and combinations thereof.

Examples of phenolics include, but are not limited to, bisphenols, novolacs, and resoles that can be derived from phenol and/or a phenol derivative, and combinations thereof.

The hardener may be employed in an epoxy equivalent weight to equivalent weight ratio of 1.0:1.2 to 1.2:1.0. For example, the hardener may be employed in an epoxy equivalent weight to hydrogen equivalent weight ratio of 1.0:1.15, 1.0:1.0, or 1.15:1.0, e.g., when the hardener includes an amine or a phenol, or the hardener may be employed in an epoxy equivalent weight to anhydride equivalent weight ratio of 1.0:1.15, 1.0:1.0, or 1.15:1.0, e.g., when the hardener includes an anhydride. Epoxy equivalent weight (EEW) may be calculated as the mass in grams of epoxy resin containing one mole of epoxide groups. Hydrogen equivalent weight (HEW) may be calculated as mass in grams of hardener containing one mole of hydrogen atoms that are capable of opening an epoxy ring. Anhydride equivalent weight (AEW) may be may be calculated as mass in grams of hardener containing one mole of anhydride groups.

For one or more embodiments, the curable compositions may include an additive. Examples of additives include, but are not limited to, nonreactive and reactive diluents; catalysts; fibers; fillers; aggregates; pigments; viscosity reducing agents; dyes; coloring agents; thixotropic agents; photo initiators; latent photo initiators, latent catalysts; inhibitors; flow modifiers; accelerators; surfactants; adhesion promoters; fluidity control agents; stabilizers; ion scavengers; UV stabilizers; fire retardants; toughening agents; wetting agents; mold release agents; coupling agents; tackifying agents, and combinations thereof. For various applications differing amounts of the additive may be employed.

The curable compositions, as disclosed herein, may be cured to obtain a product. In accordance with one or more embodiments of the present disclosure, the curable composition can be cured at a cure temperature in a with a lower limit of 0 degrees Celsius (° C.), 10° C., or 15° C. to an upper limit of 200° C., 225° C., or 250° C. where a range having combinations of the lower limit and upper limit are possible. For example, the curable composition can be cured at a temperature in a range with of 0° C. to 250° C.; 10° C. to 225° C.; or 15° C. to 200° C. However, for some applications curing temperature may be varied and the curable composition may be cured at another temperature. For one or more embodiments the curable composition can be cured to obtain a product for a time interval a with a lower limit of 1 minute, 10 minutes, or 60 minutes to an upper limit of 48 hours, 36 hours, or 24 hours. For example, the curable composition can be cured to obtain a product for a time interval in a range with of 1 minute to 48 hours; 10 minutes to 36 hours; or 60 minutes to 24 hours. However, for some applications the curing time interval may be varied and the curable composition may be cured for another time interval.

EXAMPLES

In the Examples, various terms and designations for materials were used including, for example, the following:

FORTEGRA™ (block copolymer having a thermoset-philic block and a thermoset-phobic block, where the thermoset-philic block includes constitutional units that are derived from an alkylene oxide monomer having from two to three carbon atoms and the thermoset-phobic block includes constitutional units that are derived from an alkylene oxide monomer having from four to twenty carbon atoms, available from The Dow Chemical Company), diethylene glycol monomethyl ether (available from Sigma-Aldrich), potassium hydroxide (available from Sigma-Aldrich), butylene oxide (alkylene oxide monomer having four carbon atoms, available from Sigma-Aldrich), ethylene oxide (alkylene oxide monomer having two carbon atoms, available from Sigma-Aldrich), glacial acetic acid (available from Sigma-Aldrich), ECA 100 (anhydride hardener including hexahydrophthalic anhydride and methylhexahydrophthalic anhydride, available from Dixie Chemical Company, Inc.), HYCAT™ 3000S (catalyst, available from Dimension Technology Chemical Systems, Inc.), D.E.R.™ 383 (epoxy resin, available from The Dow Chemical Company), syna-epoxy 21 (cycloaliphatic epoxy resin, available from Synasia Inc.), 1-methylimidazole (accelerator, available from Sigma-Aldrich), benzyl triethylammonium chloride (acclerator, available from Sigma-Aldrich), M52N (block copolymer having a thermoset-philic block and a thermoset-phobic block, where the thermoset-philic block includes constitutional units that are derived from a methacrylate ester monomer and the thermoset-phobic block includes constitutional units that are derived from an acrylate ester monomer, available from Arkema Inc.).

Lab Synthesized PEO-PBO Block Copolymer

A lab synthesized PEO-PBO block copolymer (a block copolymer having a thermoset-philic block and a thermoset-phobic block), was prepared as follows. A catalyzed initiator was prepared by adding diethylene glycol monomethyl ether (979.1 grams, 8.16 moles) and potassium hydroxide (29.84 grains, 85 weight percent) to a vessel. The contents of the vessel were heated to 110° C. and water was removed from the vessel under vacuum to provide the catalyzed initiator. Catalyzed initiator (123.9 grams) was added to a container and heated to 120° C. Butylene oxide (5355 grams, 74.38 moles) was slowly added to the contents of the container such that the temperature was maintained at 120° C. After addition of the butylene oxide was complete the contents of the container were digested until the pressure in the container no longer decreased. A portion of the contents of the container was removed to reduce the contents of the container to 3052 grams. Additional butylene oxide (1585 grams, 22.01 moles) was slowly added to the contents of the container such that the temperature was maintained at 120° C.; after addition of the butylene oxide was complete the contents of the container were digested until the pressure in the container leveled off to provide a butylene oxide block polymer. Butylene oxide block polymer (4016 grams) was added to a reactor. Ethylene oxide (1830 grams, 41.59 moles) was slowly added to the contents of the reactor such that the temperature was maintained at 120° C. After addition of the ethylene oxide the contents of the reactor were digested until the pressure in the reactor leveled off. Glacial acetic acid was added to the contents of the reactor to bring the pH to 6-7 (ASTM E70-90) to provide the lab synthesized PEO-PBO block copolymer. The lab synthesized PEO-PBO block copolymer had a number average molecular weight of 5397 as determined by titration of the polymer OH end groups (ASTM D 4274-94, Method D).

Example 1

Example 1, a curable composition, was prepared as follows. FORTEGRA™ (20.00 grams), ECA 100 (11.24 grams), and HYCAT™ 3000S (0.12 grams) were added to a container. The contents of the container were mixed and held at 60° C. for approximately 48 hours. Thereafter, D.E.R.™ 383 (13.00 grams) and 1-methylimidazole (0.18 grams) were added to the contents of the container to provide Example 1. The block copolymer (FORTEGRA™) was 45 weight percent of Example 1.

Example 2

Example 2, a curable composition, was prepared as Example 1 but with changes: FORTEGRA™ (30 grams), ECA 100 (9.64 grams), HYCAT™ 3000S (0.13 grams) D.E.R.™ 383 (10.99 grams), and 1-methylimidazole (0.17 grams) were employed to provide Example 2. The block copolymer (FORTEGRA™) was 60 weight percent of Example 2.

Example 3

Example 3, a curable composition, was prepared as follows. Benzyl triethylammonium chloride (0.33 grams) and ECA 100 (11 grams) were added to a container maintained at 60° C. Lab synthesized PEO-PBO block copolymer (31 grams) was added to the contents of container, which was maintained at 70° C. Syna-epoxy 21 (11 grams) was added to the contents of the container to provide Example 3. The block copolymer (lab synthesized PEO-PBO block copolymer) was 60 weight percent of Example 3.

Example 4

A curable composition was prepared as follows. Benzyl triethylammonium chloride (0.8 grams) and ECA 100 (37 grams) were added to a container maintained at 60° C. Lab synthesized PEO-PBO block copolymer (20 grams) was added to the contents of container, which was maintained at 70° C. D.E.R.™ 383 (43 grams) was added to the contents of the container to provide Example 4. The block copolymer (lab synthesized PEO-PBO block copolymer) was 20 weight percent of Example 4.

Example 5

A curable composition was prepared as follows. Benzyl triethylammonium chloride (0.7 grams) and ECA 100 (32 grams) were added to a container maintained at 60° C. Lab synthesized PEO-PBO block copolymer (30 grams) was added to the contents of container, which was maintained at 70° C. D.E.R.™ 383 (37 grams) was added to the contents of the container to provide Example 4. The block copolymer (lab synthesized PEO-PBO block copolymer) was 30 weight percent of Example 5.

Example 6

A curable composition was prepared as follows. Benzyl triethylammonium chloride (0.7 grams) and ECA 100 (30 grams) were added to a container maintained at 60° C. Lab synthesized PEO-PBO block copolymer (35 grams) was added to the contents of container, which was maintained at 70° C. D.E.R.™ 383 (34.2 grams) was added to the contents of the container to provide Example 4. The block copolymer (lab synthesized PEO-PBO block copolymer) was 35 weight percent of Example 6.

Example 7

A curable composition was prepared as follows. Benzyl triethylammonium chloride (0.34 grams) and ECA 100 (19.19 grams) were added to a container maintained at at 60° C. M52N (18 grams) was added to the contents of container, which was maintained at 70° C. Syna21 (16.6 grams) was added to the contents of the container to provide Example 5. The block copolymer (M52N) was 30 weight percent of Example 7.

Comparative Example A

Comparative Example A, a curable composition, was prepared as Example 1 but with changes: FORTEGRA™ (5 grams), ECA 100 (45.1 grams), HYCAT™ 3000S (0.3 grams) D.E.R.™ 383 (52.15 grams), and 1-methylimidazole (0.5 grams) were employed to provide Comparative Example A. The block copolymer (FORTEGRA™) was approximately 5 weight percent of Comparative Example A.

Comparative Example B

Comparative Example B, a curable composition, was prepared as follows. Benzyl triethylammonium chloride (1 gram) and ECA 100 (44.24 grams) were added to a container maintained at 60° C. Lab synthesized PEO-PBO block copolymer (5 grams) was added to the contents of container, which was maintained at 70° C. D.E.R.™ 383 (50 grams) was added to the contents of the container to provide Example B. The block copolymer (lab synthesized PEO-PBO block copolymer) was 5 weight percent of Comparative Example B.

Comparative Example C

Comparative Example C, a curable composition, was prepared as follows.

Benzyl triethylammonium chloride (1 gram) and ECA 100 (42 grams) were added to a container maintained at 60° C. Lab synthesized PEO-PBO block copolymer (10 grams) was added to the contents of container, which was maintained at 70° C. D.E.R.™ 383 (48 grams) were employed to provide Comparative Example C. The block copolymer (lab synthesized PEO-PBO block copolymer) was 10 weight percent of Comparative Example C.

Example 8

Example 8, a product obtained by curing Example 1, was prepared as follows. Example 1 (25 grams) was placed into a mold. The contents of the mold were heated to 60° C. and maintained at that temperature for 1 hour, then heated to 90° C. and maintained at that temperature for 1 hour, and then heated to 150° C. and maintained at that temperature for 1 hour to provide Example 8.

Example 9

Example 9, a product obtained by curing Example 2, was prepared as follows. Example 2 (40 grams) was placed into a mold. The contents of the mold were heated to 80° C. and maintained at that temperature for 12 hours, then heated to 150° C. and maintained at that temperature for 12 hours, to provide Example 9.

Example 10

Example 10, a product obtained by curing Example 3, was prepared as
Example 8 but with change: Example 3 (40 grams) was employed to provide Example 10.

Example 11

Example 11, a product obtained by curing Example 4, was prepared as Example 8 but with change: Example 4 (40 grams) was employed to provide Example 11.

Example 12

Example 12, a product obtained by curing Example 5, was prepared as Example 8 but with change: Example 5 (40 grams) was employed to provide Example 12.

Example 13

Example 13, a product obtained by curing Example 6, was prepared as Example 8 but with change: Example 6 (40 grams) was employed to provide Example 13.

Example 14

Example 14, a product obtained by curing Example 7, was prepared as Example 8 but with change: Example 7 (40 grams) was employed to provide Example 14.

Comparative Examples D-F

Comparative Examples D-F were obtained as Examples 6-8, with the changes that Comparative Examples A-C respectively replaced Examples 1-3.

Figure 1:
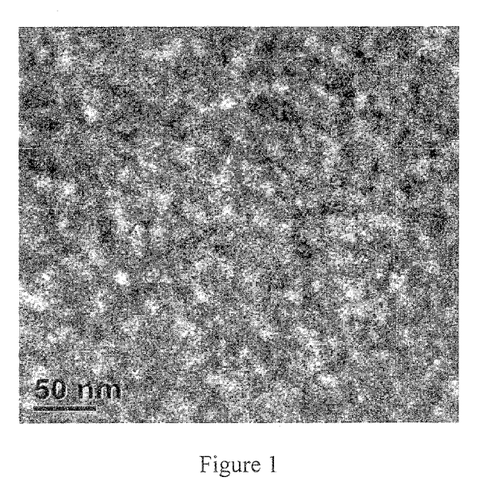
FIG. 1 is a transmission electron microscopy (TEM) image of a product in accordance with one or more embodiments of the present disclosure.

FIG. 1 is a transmission electron microscopy (TEM) image of a product in accordance with one or more embodiments of the present disclosure. The product, i.e. Example 8 as discussed herein, shown in FIG. 1 was obtained from a curable composition, i.e. Example 1 as discussed herein, where a block copolymer having an epoxy-philic block and an epoxy-phobic block was 45 weight percent the curable composition. As seen in FIG. 1, the product includes two phases represented respectively by the relatively lighter and relatively darker materials. The two phases shown in FIG. 1 are continuous.

Figure 2:
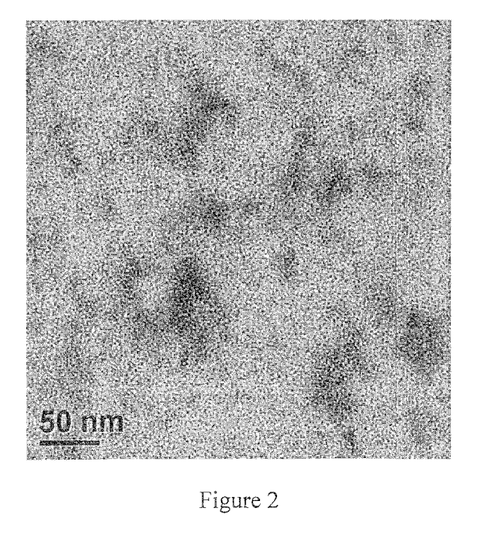
FIG. 2 is a TEM image of a product obtained by curing a curable composition.

FIG. 2 is a TEM image of a product obtained by curing a curable composition. The product, i.e. Comparative Example D as discussed herein, shown in FIG. 2 was obtained from a curable composition, i.e. Comparative Example A as discussed herein, where a block copolymer was apporiximately 0 weight percent the curable composition. Like FIG. 1, the product in FIG. 2 includes two phases represented respectively by the relatively lighter and relatively darker materials. However, unlike FIG. 1, the two phases shown in FIG. 2 are not continuous. The two phases shown in FIG. 2 are isolated, e.g., islands. The TEM image of FIG. 1, in comparison to the TEM image of FIG. 2, shows that new materials, e.g., products having two continuous phases, are obtained from the curable compositions, as disclosed herein.

Figure 3:
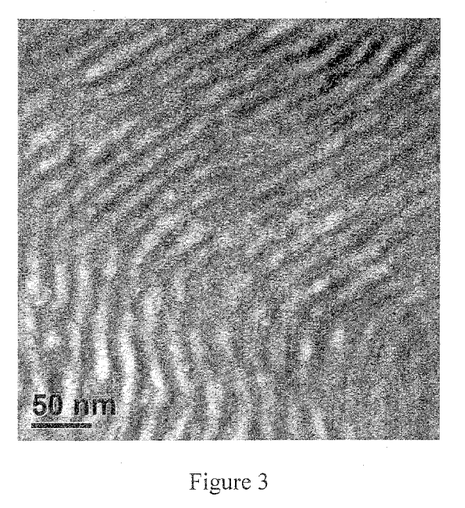
FIG. 3 is a TEM image of a product in accordance with one or more embodiments of the present disclosure.

FIG. 3 is a TEM image of a product in accordance with one or more embodiments of the present disclosure. The product, i.e. Example 13 as discussed herein, shown in FIG. 3 was obtained from a curable composition, i.e. Example 6 as discussed herein, where a block copolymer having a thermoset-philic block and a thermoset-phobic block was 35 weight percent the curable composition. As seen in FIG. 3, the product includes two phases represented respectively by the relatively lighter and relatively darker materials. The two phases shown in FIG. 3 are continuous.

Figure 4:
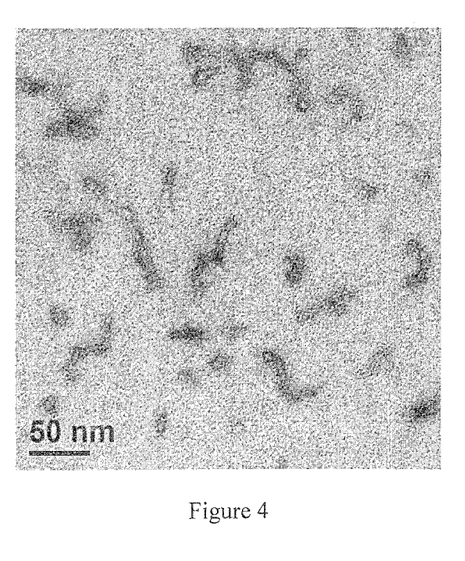
FIG. 4 is a TEM image of a product obtained by curing a curable composition.

FIG. 4 is a TEM image of a product obtained by curing a curable composition. The product, i.e. Comparative Example E as discussed herein, shown in FIG. 4 was obtained from a curable composition, i.e. Comparative Example B as discussed herein, where a block copolymer was 5 weight percent the curable composition. Like FIG. 3, the product in FIG. 4 includes two phases represented respectively by the relatively lighter and relatively darker materials. However, unlike FIG. 3, the two phases shown in FIG. 4 are not continuous. The two phases shown in FIG. 4 are isolated, e.g., islands. The TEM image of FIG. 3, in comparison to the TEM image of FIG. 4, shows that new materials, e.g., products having two continuous phases, are obtained from the curable compositions, as disclosed herein.

Figure 5:
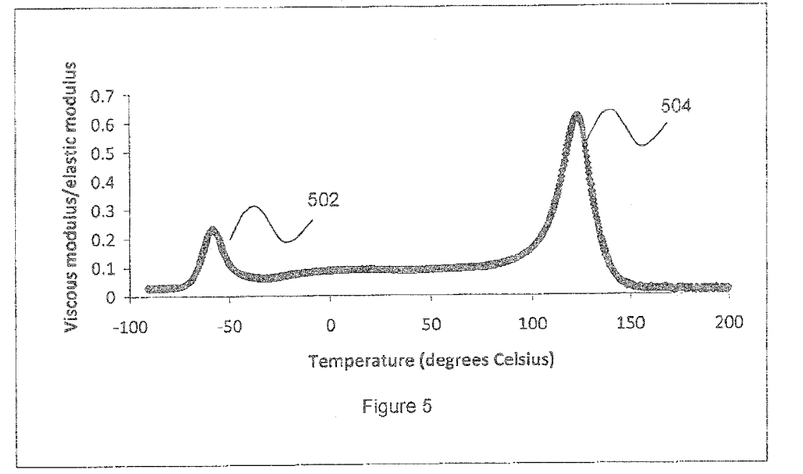
FIG. 5 illustrates dynamic mechanical thermal analysis (DMTA) data obtained for a product in accordance with one or more embodiments of the present disclosure.

FIG. 5 illustrates dynamic mechanical thermal analysis (DMTA) data obtained for a product in accordance with one or more embodiments of the present disclosure. The DMTA data shown in FIG. 5 corresponds to a product, i.e. Example 9 as discussed herein, obtained from a curable composition, i.e. Example 4 as discussed herein, where a block copolymer having a thermoset-philic block and a thermoset-phobic block was 35 weight percent the curable composition. As seen in FIG. 5, there are two glass transition temperatures. The first glass transition temperature corresponds to peak 502 and the second glass transition temperature corresponds to peak 504.

Figure 6:
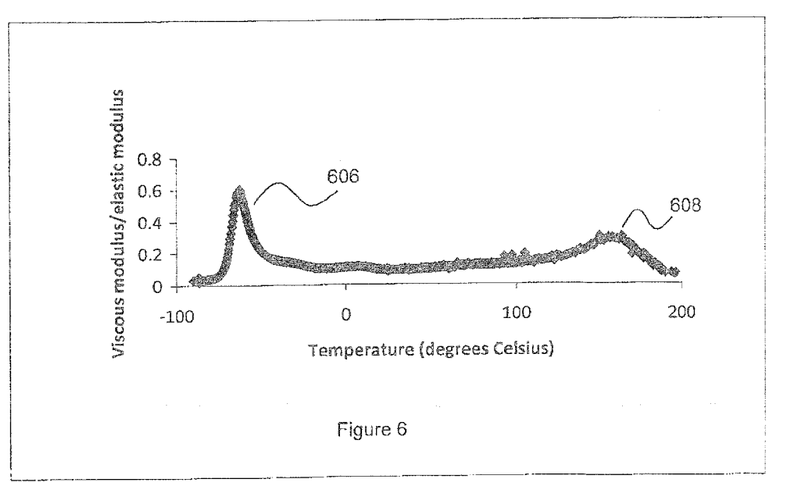
FIG. 6 illustrates DMTA data obtained for a product in accordance with one or more embodiments of the present disclosure.

FIG. 6 illustrates DMTA obtained for a product in accordance with one or more embodiments of the present disclosure. The DMTA data shown in FIG. 6 corresponds to a product, i.e. Example 9 as discussed herein, obtained from a curable composition, i.e. Example 2 as discussed herein, where a block copolymer having an epoxy-philic block and an epoxy-phobic block was 60 weight percent the curable composition. As seen in FIG. 6, there are two glass transition temperatures. The first glass transition temperature corresponds to peak 606 and the second glass transition temperature corresponds to peak 608.

Figure 7:
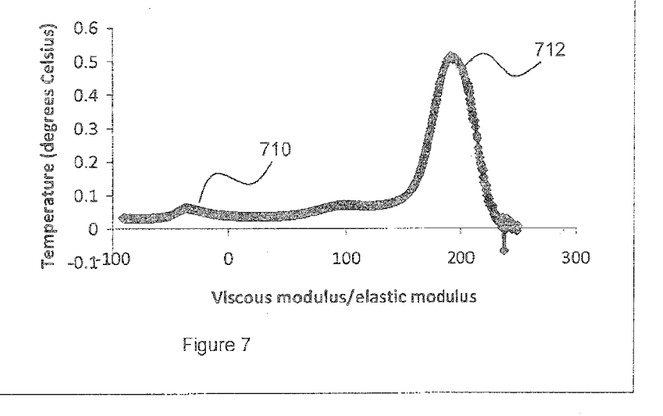
FIG. 7 illustrates DMTA data obtained for a product in accordance with one or more embodiments of the present disclosure.

FIG. 7 illustrates DMTA data obtained for a product in accordance with one or more embodiments of the present disclosure. The DMTA data shown in FIG. 7 corresponds to a product, i.e. Example 14 as discussed herein, obtained from a curable composition, i.e. Example 7 as discussed herein, where a block copolymer having an epoxy-philic block and an epoxy-phobic block was 30 weight percent the curable composition. As seen in FIG. 7, there are two glass transition temperatures. The first glass transition temperature corresponds to peak 710 and the second glass transition temperature corresponds to peak 712.

Figure 8:
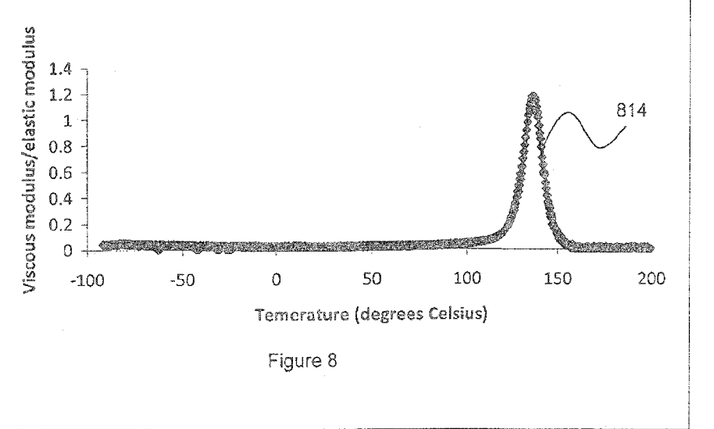
FIG. 8 illustrates DMTA data obtained for a product obtained by curing a curable composition.

FIG. 8 illustrates DMTA data obtained for a product obtained by curing a curable composition. The DMTA data shown in FIG. 8 corresponds to a product, i.e. Comparative Example E as discussed herein, obtained from a curable composition, i.e. Comparative Example B as discussed herein, where a block copolymer was 5 weight percent the curable composition. As seen in FIG. 8 and in contrast to FIGS. 5-7, there is a single glass transition temperature. The single glass transition temperature corresponds to peak 814.

The DMTA data of FIGS. 5-7, in comparison to the DMTA data of FIG. 8, shows that new materials, e.g., products having two glass transition temperatures, are obtained from the curable compositions, as disclosed herein. The additional glass transition temperature shown by the DMTA data in FIGS. 5-7 is a significant change that can result in differing product properties as compared to a product having a single glass transition temperature, such as shown by the DMTA data in FIG. 8.

Modulus of elasticity was determined for Examples 11-13 and

Comparative Examples D-F according to ASTM D-638. The results are shown in Table 1 and Table 2, respectively. Also, elongation at break was determined for Examples 11-13 and Comparative Examples D-F according to ASTM D-638. The results are shown in Table 3 and Table 4, respectively.

TABLE 1

| Example # | Modulus of elasticity (megapascals) |
|---|---|
| Example 11 | 1.90 |
| Example 12 | 1.10 |
| Example 13 | 0.48 |

TABLE 2

| Comparative Example # | Modulus of elasticity (megapascals) |
|---|---|
| Comparative Example D | 3.40 |
| Comparative Example E | 3.30 |
| Comparative Example F | 2.80 |

TABLE 3

| Example # | Elongation at break (percentage) |
|---|---|
| Example 11 | 4.3 |
| Example 12 | 5.9 |
| Example 13 | 17.0 |

TABLE 4

| Comparative Example # | Elongation at break (percentage) |
|---|---|
| Comparative Example D | 6.1 |
| Comparative Example E | 5.2 |
| Comparative Example F | 3.9 |

The data in Table 1 show that increasing amounts of the block copolymer result in a correspondingly lower modulus of elasticity. Table 2 show that increasing amounts of the block copolymer results in a relatively small correspondingly lower modulus of elasticity. The data in Table 1, in contrast to the data in Table 2, show that the weight percentages of the block copolymer in the curable compositions as disclosed herein have a much greater effect on modulus of elasticity, as compared to other, i.e. lesser, weight percentages of the block copolymer in other curable compositions.

The data in Table 3 show that products obtained by curing the curable compositions disclosed herein provide an increase in percentage of elongation at break. The data in Table 4, in contrast to the data in Table 3, show that products obtained by curing curable compositions having less than 20 weight percent of block copolymer provide a decrease in percentage of elongation at break, even as the weight percentage of block copolymer is increased.

What is claimed:

1. A curable composition comprising:
   an epoxy resin;
   a curing agent; and
   a block copolymer having a thermoset-philic block and a thermoset-phobic block, wherein the block copolymer is from 60 weight percent to 80 weight percent of the curable composition, the thermoset-philic block includes constitutional units that are derived from an alkylene oxide monomer, and the thermoset-phobic block includes constitutional units that are derived from an alkylene oxide monomer.

2. The curable composition of claim 1, wherein the alkylene oxide monomer that constitutional units of the thermoset-philic block are derived from has from two to three carbon atoms.

3. The curable composition of claim 1, wherein the alkylene oxide monomer that constitutional units of the thermoset-phobic block are derived from has from four to twenty carbon atoms.

4. The curable composition of claim 1, wherein the thermoset-philic block includes constitutional units that are derived from an alkylene oxide monomer having two carbon atoms and the thermoset-phobic block includes constitutional units that are derived from an alkylene oxide monomer having four carbon atoms.

5. The curable composition of claim 1, wherein the block copolymer has a number average molecular weight in a range from 1000 to 50000.

6. The curable composition of claim 1, wherein the block copolymer is a diblock copolymer.

7. The curable composition of claim 1, wherein the block copolymer is a multiblock copolymer.

8. The curable composition of claim 1, wherein the epoxy resin is selected from the group consisting of an aromatic epoxy resin, an alicyclic epoxy resin, an aliphatic epoxy resin, and combinations thereof.

9. The curable composition of claim 1, wherein the curing agent is selected from the group consisting of hexahydrophthalic anhydride, methyltetrahydrophthalic anhydride, methylhexahydrophthalic anhydride, methylnadic anhydride, methylbutenyltetrahydrophthalic anhydride, and combinations thereof.

10. A product obtained by curing the curable composition of claim 1.

* * * * *